July 7, 1942. R. CHILTON 2,289,285
TORQUE METER
Filed Dec. 28, 1938  2 Sheets-Sheet 1
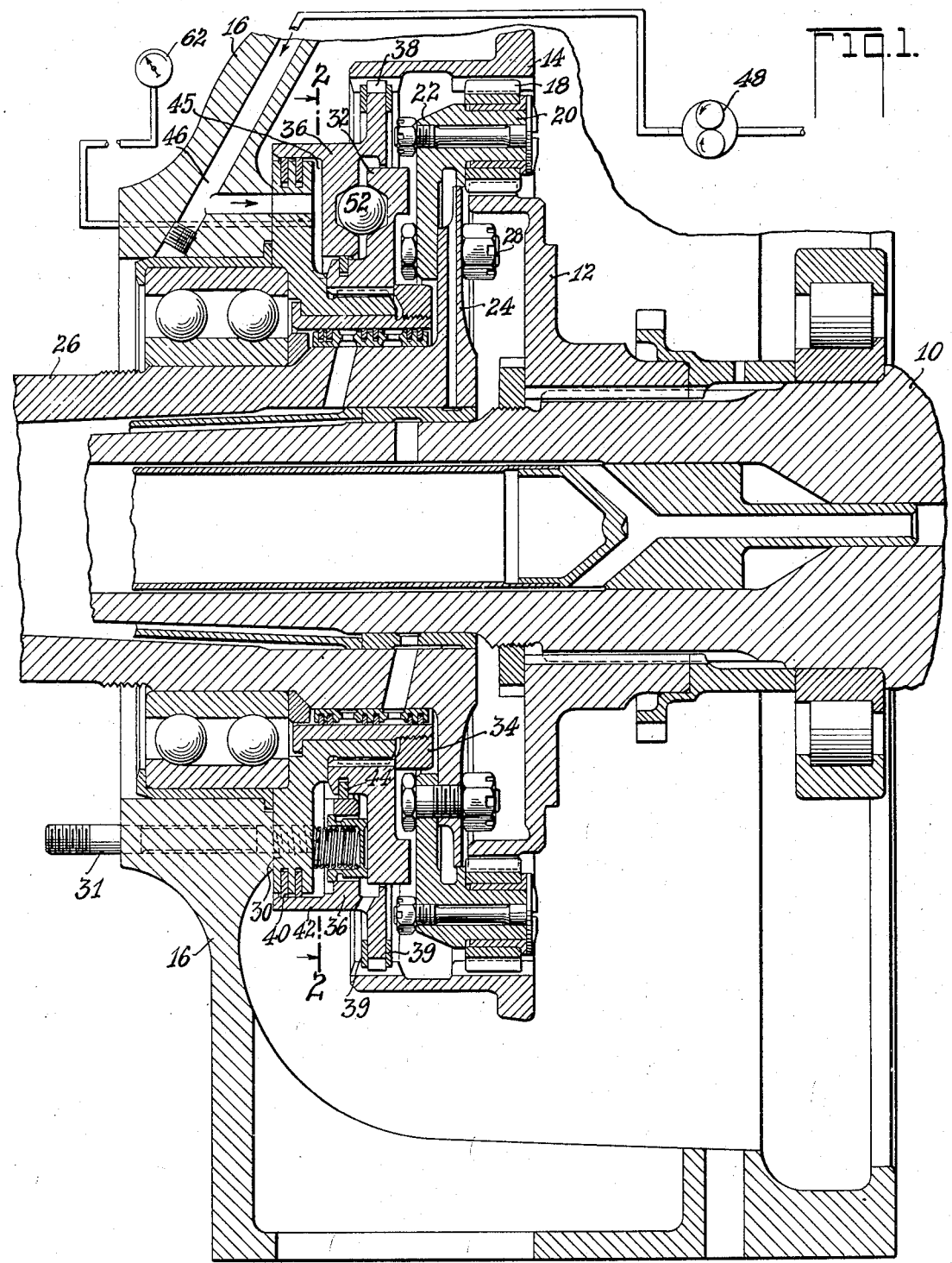
INVENTOR
ROLAND CHILTON
BY
ATTORNEY July 7, 1942.     R. CHILTON     2,289,285
TORQUE METER
Filed Dec. 28, 1938     2 Sheets-Sheet 2
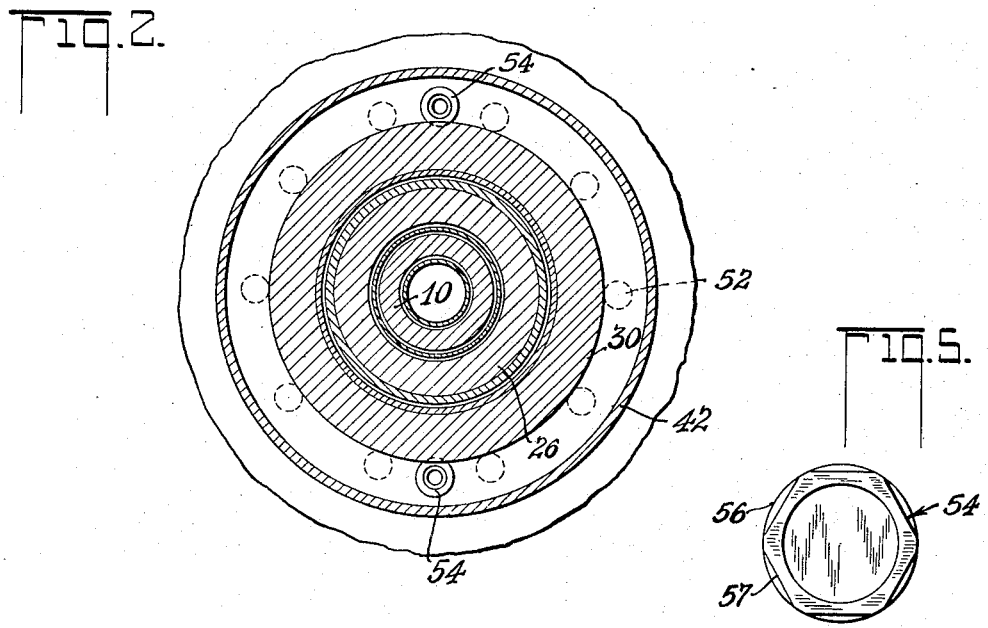
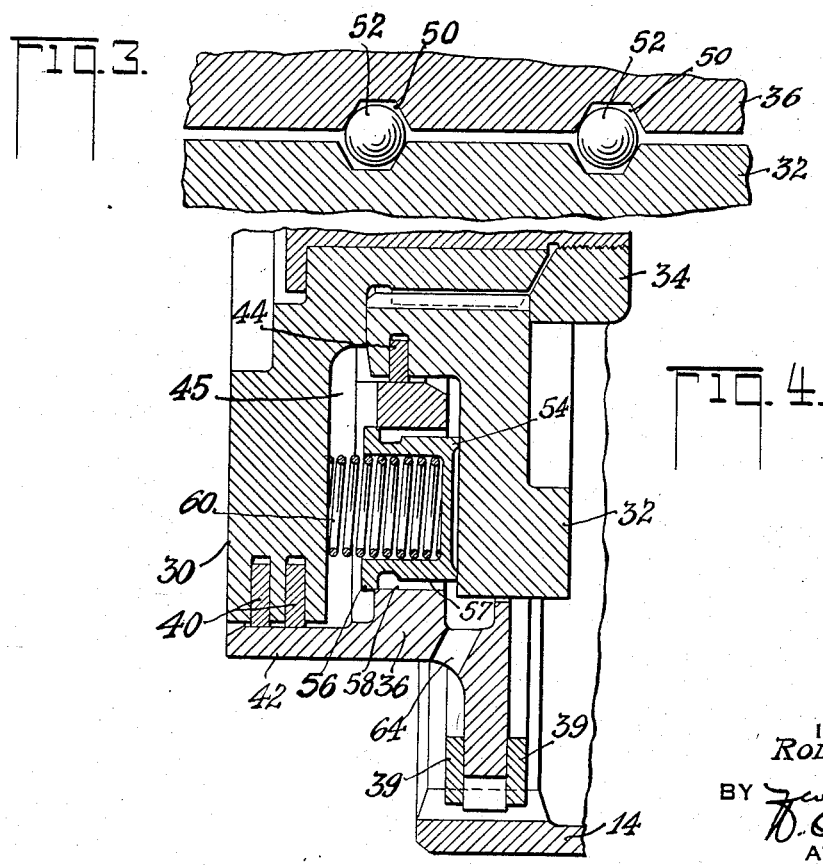
INVENTOR
ROLAND CHILTON
BY
ATTORNEY Patented July 7, 1942

2,289,285

UNITED STATES PATENT OFFICE 2,289,285

TORQUE METER

Roland Chilton, Ridgewood, N. J., assignor to Wright Aeronautical Corporation, a corporation of New York Application December 28, 1938, Serial No. 248,053

8 Claims. (Cl. 265—25)

This invention relates to means for giving a continuous reading of the torque to which a given mechanism may be subject, the drawings illustrating the application of the device to the planetary gear of an aircraft engine.

In certain aspects the invention comprises improvements on my Patents Nos. 2,061,896 and 2,040,833.

In its broadest aspect, the invention comprises improved means for generating hydraulic pressure in proportion with the torque on a transmission member and in the present instance, the device is applied to the stationary or reaction gear of a planetary gear train of an aircraft motor.

Objects of the invention are to provide a compact concentric type of device, applicable particularly to planetary gears and suited for the heavy torques encountered in the larger engines now going into use.

Other objects of the invention will be obvious from or will be pointed out in the following description with reference to the drawings in which, Fig. 1 is a fragmentary longitudinal section through a reduction gear embodying the device;

Fig. 2 is a fragmentary section on the line 2—2 of Fig. 1;

Fig. 3 is a fragmentary developed section illustrating torque responsive balls and pockets, Fig. 4 is an enlarged view of a portion of Fig. 1 illustrating a valve element, and Fig. 5 is an end view of a valve element.

Referring first to Fig. 1, 10 designates a conventional engine crankshaft to which is rigidly splined an inner or driving gear 12 of a planetary reduction gear including a fixed or reaction gear 14 which gear in current engines (not having a torque meter) is bolted rigidly to a gear housing 16 which is in turn rigid with the engine crankcase. Engaged between the driving gear 12 and the reaction gear 14 are a multiplicity of small pinions 18 mounted on corresponding plurality of journals 20 comprising cantilevers rigid with a back plate 22 which in turn is secured to a disc 24 of a conventional propeller shaft 26 as by bolts 28.

According to the present invention, in place of securing the reaction gear 14 directly and rigidly to the gear housing 16, there is interposed therebetween a torque-responsive device comprising an anchor member 30 to which is rigidly splined a thrust plate 32, additionally secured by a nut 34. The member 30 carries studs 31, one of which is shown, these studs passing through the housing 16 and through a nose plate, not shown, the outer ends of the studs being provided with nuts, not shown, by which the housing 16 and the nose plate are secured between the nuts and the member 30. Interposed between the rigid anchor member 30 and the thrust plate 32 is a back plate 36 splined at 38 to be torsionally rigid with the reaction gear 14, and axially located relative thereto by snap rings 39 seated in grooves in the gear. The anchor member 30 is provided with piston rings 40 engaging a cylindrical extension 42 of the gear back plate 36 and the thrust plate 32 is also provided with a piston ring 44 engaging an inner bore in the back plate 36 as shown. These piston rings seal a hydraulic cavity 45 defining an annular area between the back plate 36 and the anchor member 30, this cavity being fed with oil through a passage 46 from an oil pump shown diagrammatically at 48.

The back plate 36 and the thrust plate 32 are provided with a plurality of circumferentially arranged conical pockets 50, engaging balls 52 (Fig. 3), the dimensions being adjusted so that when the nut 34 is tight, there is slight rotational and axial backlash of the back plate 36 and reaction gear 14 relative to the thrust plate 32.

It will now be seen that, due to the slope of the ball pockets 50, any torque impressed upon the gear 14 and its back plate 36 will produce a proportional leftward axial reaction on this plate which comprises a hydraulic piston opposing the hydraulic pressure in the cavity 45. This reaction is balanced and measured as follows: Referring to Fig. 4, it will be seen that the pressure plate 32 has abutted against it a valve 54 having a circular head 56 and a flatted stem 57 cooperating with a bore 58 in the back plate 36, the valve being maintained in contact with the pressure plate 32 by hydraulic pressure in the cavity 45 and by the assembly spring 60. In the position shown in Fig. 4, the torque reaction has moved the back plate 36 sufficiently far to the left to close off the outlet valve head 56 so that there is no escape for the oil delivered by pump 48 through the passage 46 and the pump pressure, accordingly, builds up until the hydraulic load on the annular piston area of the back plate 36 is sufficient to slightly over-balance the axial reaction generated from the torque through the balls 52 acting against the conical pockets 50. The resulting rightward movement of the plate 36 establishes a minute opening of the valve head 56 relative to the bore 58, permitting escape of the oil past the flatted valve stem 57 until the pump pressure just balances the axial reaction from the torque. This balance pressure is read on a hydraulic gauge 62 connected into the cavity 45 as indicated in Fig. 1. Oil passing from the cavity 45 flows through drillings such as 64 to the gear housing.

It will be seen that the entire delivery of the pump 48 is at all times led to the torque measuring piston cavity 45 and that this entire quantity has at all times to escape beneath the head 56 of the valve 54. Accordingly, the back plate 36 adjusts itself to give that minute valve opening which will control the pump pressure to axially balance the instant torque reaction.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine reduction gear including a planetary gear set comprising a gear subject to reaction torque, an anchor member having pockets including inclined sides, said gear having opposing pockets including inclined sides, roller members seated in said pockets engaging said sides by which circumferential reaction between the reaction gear and anchor member is converted to axial thrust, said gear and member comprising a piston-cylinder assembly, means to feed fluid under pressure to said assembly to offset said axial thrust, means responsive to said thrust for controlling the fluid pressure, and means responsive to fluid pressure in the piston-cylinder assembly for indicating torque.

2. In an engine reduction gear comprising planet pinions and a reaction gear engaged therewith, said gear being axially and rotationally movable in response to torque transmitted through the reduction gear, means to convert reaction gear torque to axial thrust thereon, an annular piston-cylinder assembly concentric with the gear having one stationary element and one element secured to the reaction gear, fluid pressure means connected to said assembly to counteract said axial thrust, valve means responsive to axial movement of said reaction gear to equate the fluid pressure to the reaction thrust, and means responsive to fluid pressure in the piston-cylinder assembly for indicating torque.

3. In an engine reduction gear, a reaction gear including a member having an annularly arranged series of pockets including inclined sides and comprising a cylinder, a support having an annularly arranged series of pockets including inclined sides opposite said first series and comprising a piston engaged in fluid sealed relation with said cylinder, rollers in said pockets by which torsional force applied to said reaction element is translated to axial force through said inclined sides, means to feed fluid under such pressure to said piston-cylinder assembly as to balance said axial force, and means responsive to fluid pressure in the cylinder for indicating torque.

4. In an engine reduction gear, a reaction gear including a member having an annularly arranged series of pockets including inclined sides and comprising a cylinder, a support having an annularly arranged series of pockets including inclined sides opposite said first series and comprising a piston engaged in fluid sealed relation with said cylinder, rollers in said pockets by which torsional force applied to said reaction element is translated to axial force through said inclined sides, means to feed fluid under pressure to said piston-cylinder assembly to resist said axial force through said sides, a valve, operated by axial displacement of the cylinder and piston, to bleed fluid from the cylinder, and to maintain in the cylinder fluid pressure to balance said thrust, and means responsive to fluid pressure in the cylinder for indicating torque.

5. In an engine reduction gear, a reaction gear including a member having an annularly arranged series of pockets including inclined sides and comprising a cylinder, a support having an annularly arranged series of pockets including inclined sides opposite said first series and comprising a piston engaged in fluid sealed relation with said cylinder, rollers in said pockets by which torsional force applied to said reaction element is translated to axial force through said sides, means to feed fluid under pressure to said piston-cylinder assembly to resist said axial force, a valve operated by axial displacement of the cylinder and piston to bleed fluid from the cylinder, said valve having small area as compared with the piston area and being organized to close upon movement of the piston into the cylinder due to increase in reaction force on the cylinder and to open upon movement of the piston out of the cylinder due to decreased reaction force, and means responsive to fluid pressure in the cylinder for indicating torque.

6. In an engine reduction gear, a support comprising one element of a piston-cylinder assembly, a substantially stationary, but axially and rotationally oscillatable reaction member concentric with the assembly and comprising the second element of said piston-cylinder assembly, means to convert torque reaction on said member to axial thrust, means to supply fluid under pressure to said assembly to resist said reaction member axial movement, a valve in said assembly operative in response to axial member movement to maintain a pressure in the assembly to balance the axial thrust on said reaction member, and means responsive to fluid pressure in the assembly for indicating torque.

7. In a power transmission, concentric elements subject to torque therebetween, said elements each having an annularly arranged series of pockets including inclined sides, the pockets of the elements facing each other, roller elements in said pockets whereby torsion between the elements is converted to axial thrust, means including a piston on one element engaging and substantially sealed in a cylinder on the other element by which the elements are relatively movable axially and rotationally, means to supply pressure fluid to said cylinder to resist axial movement of said elements, a valve operated by axial movement of the piston relative to the cylinder to maintain a fluid pressure in the cylinder to balance said axial thrust, said valve opening area at all times being less than the piston circumference times the axial movement of the piston relative to the cylinder, and means responsive to fluid pressure in the cylinder for indicating torque.

8. In a power transmission, two transmission elements subject to the reaction torque thereon and relatively movable axially and rotationally, facing annular members on said elements, each of said members having a plurality of pockets having inclined sides, torque and thrust transmitting means within said pockets of the members, whereby torsion between the elements is converted to axial thrust, means to resist said thrust comprising a piston-cylinder assembly in fluid sealed engagement, the piston being secured to one element and the cylinder being secured to the other, means to supply pressure fluid to said cylinder to resist axial movement of said elements, a bleed valve for the cylinder operable in response to axial piston movement in the cylinder and having an opening area at all times less than the piston circumference times the axial movement between the piston and cylinder, and means to measure the fluid pressure in said cylinder.

ROLAND CHILTON.